(12) United States Patent
Yoshida et al.

(10) Patent No.: US 8,220,679 B2
(45) Date of Patent: Jul. 17, 2012

(54) BICYCLE BATTERY HOLDER ASSEMBLY

(75) Inventors: Fumiaki Yoshida, Osaka (JP); Kazuhiro Fujii, Osaka (JP)

(73) Assignee: Shimano Inc., Osaka (JP)

( * ) Notice: Subject to any disclaimer, the term of this patent is extended or adjusted under 35 U.S.C. 154(b) by 1031 days.

(21) Appl. No.: 11/545,771

(22) Filed: Oct. 11, 2006

(65) Prior Publication Data

US 2008/0088108 A1   Apr. 17, 2008

(51) Int. Cl.
*B62J 7/00* (2006.01)
*H01M 2/10* (2006.01)

(52) U.S. Cl. ..... 224/425; 224/412; 224/419; 248/309.2; 429/100; 429/96

(58) Field of Classification Search ............. 429/96, 429/97, 98, 99; 248/309.2, 220.22; 180/68.5
See application file for complete search history.

(56) References Cited

U.S. PATENT DOCUMENTS

| | | | | |
|---|---|---|---|---|
| 1,176,927 A * | 3/1916 | Resenfeld | ............... | 248/309.2 |
| 1,439,430 A * | 12/1922 | Lyhne | ............... | 429/97 |
| 1,574,300 A * | 2/1926 | Martus et al. | ............... | 429/99 |
| 1,579,369 A * | 4/1926 | Koch et al. | ............... | 429/99 |
| 2,449,811 A * | 9/1948 | Harford | ............... | 429/97 |
| 3,070,748 A * | 12/1962 | Worobey et al. | ............... | 455/343.1 |
| 3,248,268 A * | 4/1966 | Kohler | ............... | 429/96 |
| 3,510,376 A * | 5/1970 | Douglas et al. | ............... | 429/8 |
| 3,736,741 A * | 6/1973 | Paratte | ............... | 368/204 |
| 4,129,194 A * | 12/1978 | Hammond et al. | ............... | 180/68.5 |
| 4,309,741 A * | 1/1982 | Smith | ............... | 362/473 |
| 4,339,060 A * | 7/1982 | Braida, Jr. | ............... | 224/428 |
| 4,395,696 A * | 7/1983 | Menard | ............... | 340/431 |
| 4,508,794 A * | 4/1985 | Wright | ............... | 429/100 |
| 5,040,627 A * | 8/1991 | Swayze | ............... | 180/68.5 |
| 5,170,981 A * | 12/1992 | Lin | ............... | 248/311.2 |
| 5,172,043 A * | 12/1992 | Toops | ............... | 320/106 |
| 5,217,824 A * | 6/1993 | Womack | ............... | 429/96 |
| 5,276,593 A * | 1/1994 | Lighthill | ............... | 362/473 |
| 5,489,486 A * | 2/1996 | Glover | ............... | 429/100 |
| 5,597,225 A * | 1/1997 | Davis | ............... | 362/473 |
| 5,686,810 A * | 11/1997 | Yasui | ............... | 320/113 |
| 5,704,803 A * | 1/1998 | Oshima | ............... | 439/500 |
| 5,736,271 A * | 4/1998 | Cisar | ............... | 429/96 |
| 6,224,997 B1 * | 5/2001 | Papadopoulos | ............... | 429/99 |
| 6,411,503 B1 * | 6/2002 | Kambayashi et al. | ... | 361/679.41 |
| 6,423,443 B1 * | 7/2002 | Tsuboi | ............... | 429/98 |
| 6,459,176 B1 * | 10/2002 | Brockel et al. | ............... | 307/150 |
| 6,501,245 B2 * | 12/2002 | Okuda | ............... | 320/112 |
| 6,564,982 B1 * | 5/2003 | Woods et al. | ............... | 224/420 |
| 6,568,956 B1 * | 5/2003 | Holmberg | ............... | 439/500 |
| 6,577,101 B1 * | 6/2003 | Takeshita et al. | ............... | 320/112 |
| 6,584,872 B1 * | 7/2003 | Kojima | ............... | 74/551.8 |
| 6,669,220 B2 * | 12/2003 | Meggiolan | ............... | 280/288.4 |

(Continued)

FOREIGN PATENT DOCUMENTS

CN   1437276 A   8/2003

(Continued)

*Primary Examiner* — Nathan J Newhouse
*Assistant Examiner* — Peter Helvey
(74) *Attorney, Agent, or Firm* — Global IP Counselors, LLP

(57) ABSTRACT

A bicycle battery holder assembly includes a terminal support portion and a pair of seal members. The terminal support portion has a pair of electrical terminals extending therefrom. The pair of electrical terminals are configured to extend into corresponding terminal receiving portions of a battery. The seal members extend around respective ones of the electrical terminals.

12 Claims, 6 Drawing Sheets

U.S. PATENT DOCUMENTS

| | | | |
|---|---|---|---|
| 6,894,893 B2 * | 5/2005 | Hidesawa | 361/679.55 |
| 6,896,277 B2 | 5/2005 | Meggiolan | |
| 6,981,413 B2 * | 1/2006 | Kinoshita | 73/493 |
| 7,100,932 B2 * | 9/2006 | Meggiolan | 280/288.4 |
| 7,136,682 B2 * | 11/2006 | Lin | 455/575.1 |
| 7,243,937 B2 * | 7/2007 | Ishikawa | 280/288.4 |
| 7,267,352 B2 * | 9/2007 | Ishikawa | 280/288.4 |
| 7,886,947 B2 * | 2/2011 | Campagnolo | 224/414 |
| 2001/0042767 A1 * | 11/2001 | Campagnolo | 224/414 |
| 2005/0156001 A1 | 7/2005 | Dal Pra et al. | |

FOREIGN PATENT DOCUMENTS

| | | |
|---|---|---|
| DE | 298 13 966 U1 | 12/1998 |
| DE | 298 07 251 U1 | 8/1999 |

* cited by examiner

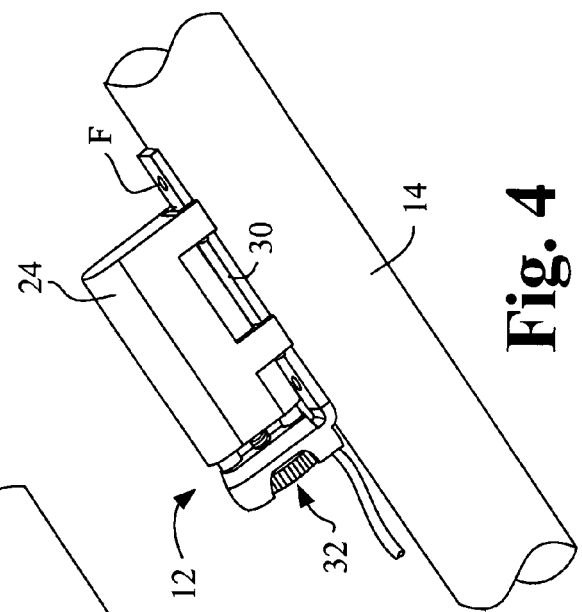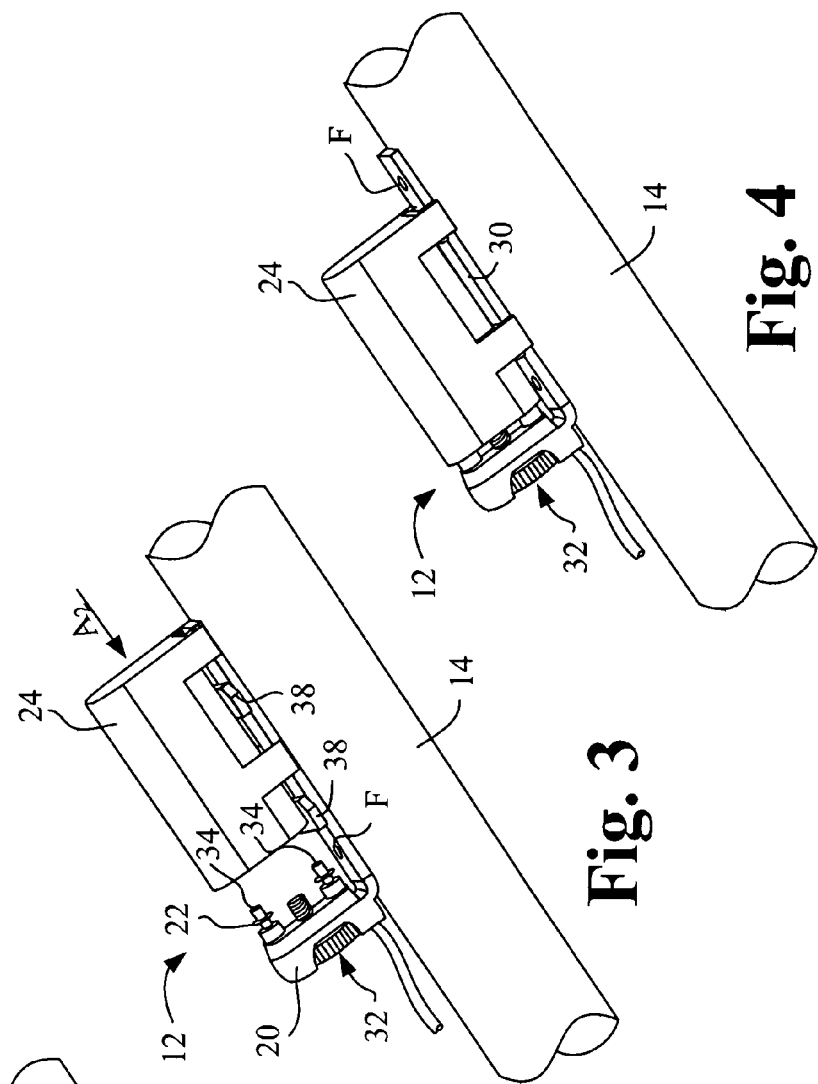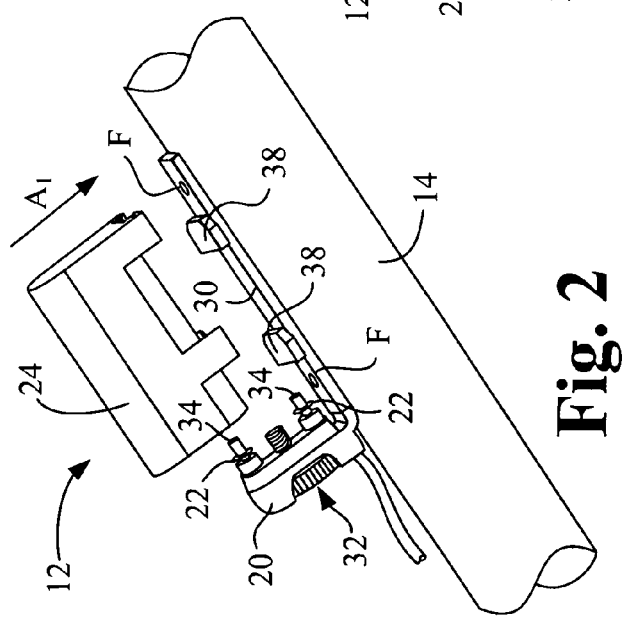

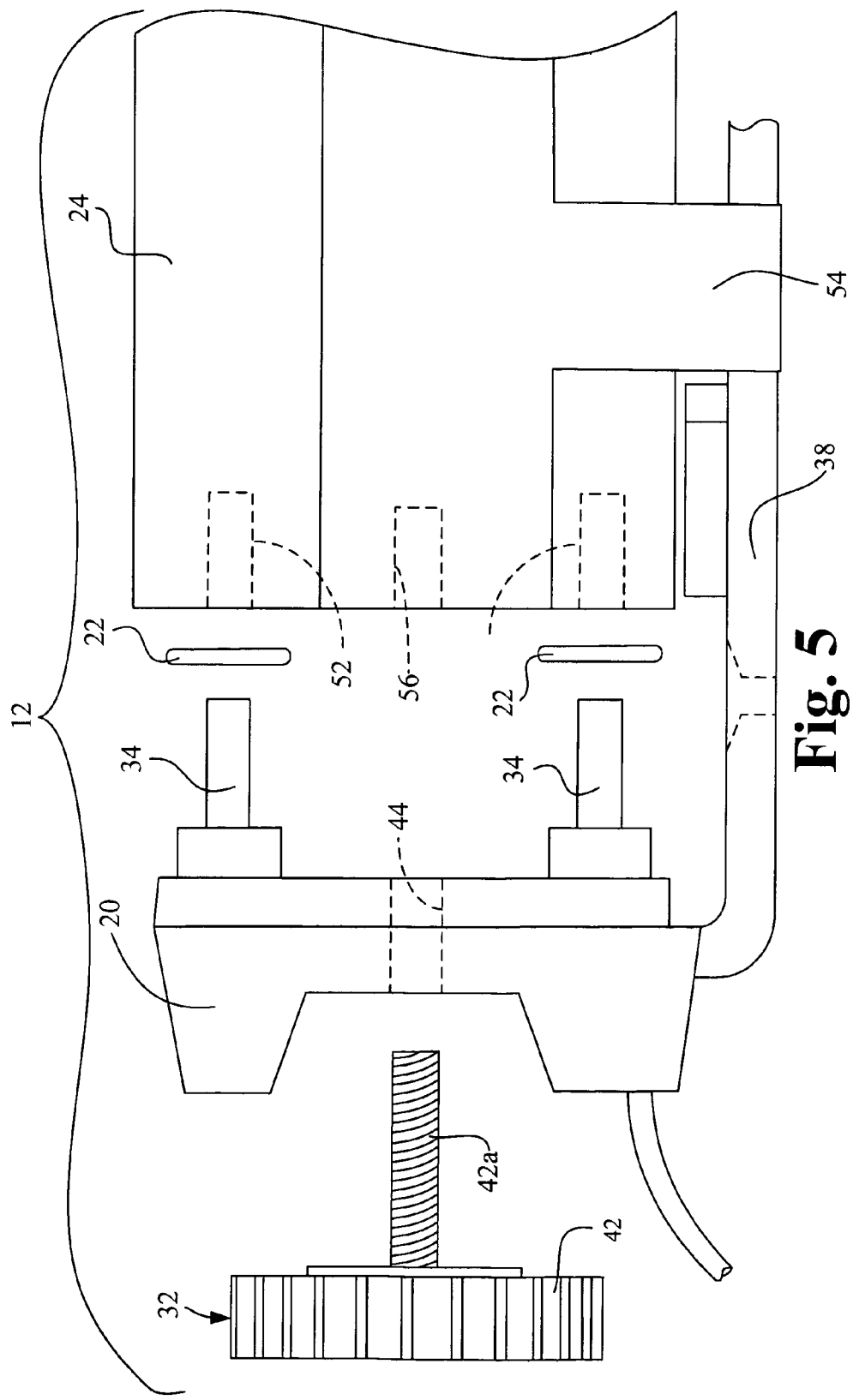

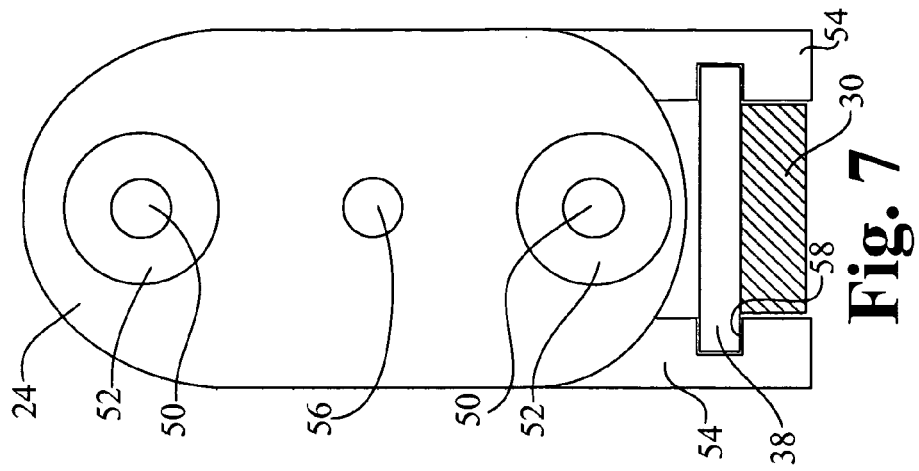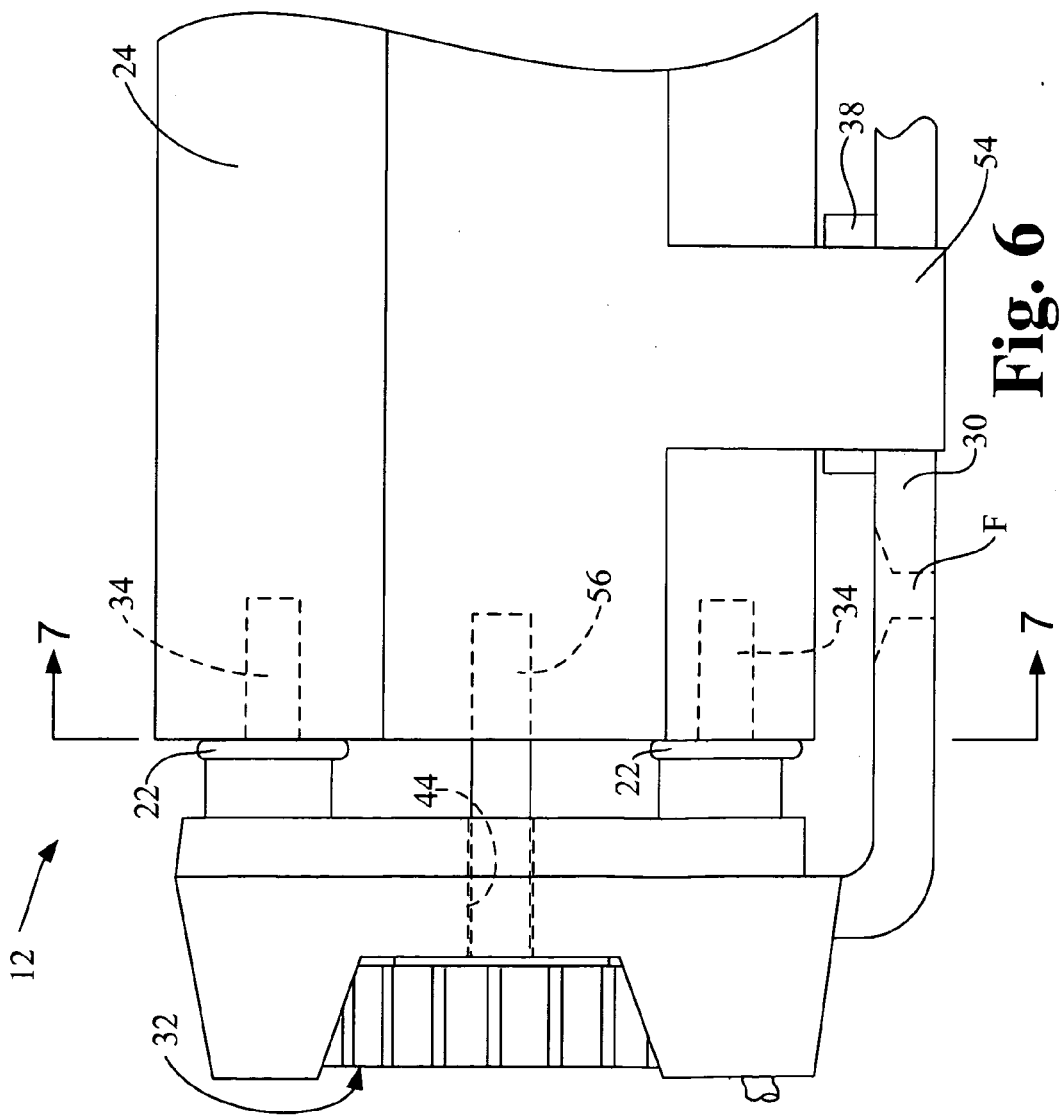

BICYCLE BATTERY HOLDER ASSEMBLY

BACKGROUND OF THE INVENTION

1. Field of the Invention

This invention generally relates to a bicycle battery holder assembly. More specifically, the present invention relates to bicycle battery holder assembly having a seal structure to protect electric terminals.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle shifter and derailleur system(s).

Specifically many bicycles are now provided with electrically powered shifter and derailleur systems. Such systems require electricity from a power source, such as a rear wheel hub generator and/or a battery. A problem associated with the use of a battery to provide power for electrically powered shifter systems and lighting systems is that bicycles are exposed to a variety of weather conditions, such as rain, wind and snow. Further road contamination such as dust, mud and other debris can contaminate and cause degradation and/or corrosion of electrical components, such as battery terminals.

In view of the above, it will be apparent to those skilled in the art from this disclosure that there exists a need for an improved battery holder assembly that prevents such contaminants and weather conditions from harming sensitive electrical components. This invention addresses this need in the art as well as other needs, which will become apparent to those skilled in the art from this disclosure.

SUMMARY OF THE INVENTION

One object of the present invention is to provide a seal structure for a battery holder assembly that protects electric terminals and contacts.

Another object of the present invention is to provide a simple means for installing and replacing seals that protect electric terminals and contacts.

The foregoing objects can basically be attained by providing a bicycle battery holder assembly with a terminal support portion and a pair of seals. The terminal support portion has a pair of electrical terminals extending therefrom. The pair of electrical terminals are configured to extend into corresponding terminal receiving portions of a battery. The pair of seal members extend around respective ones of the electrical terminals.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2 is a side perspective exploded view of the bicycle showing the portion of the bicycle frame and the battery holder assembly with the battery positioned for installation into the battery holder assembly in accordance with one embodiment of the present invention;

FIG. 3 is another side perspective exploded view of the bicycle similar to FIG. 2, showing the battery contacting but not yet installed in the battery holder assembly in accordance with one embodiment of the present invention;

FIG. 4 is yet another side perspective exploded view of the bicycle similar to FIG. 2, showing the battery fully installed in the battery holder assembly in accordance with one embodiment of the present invention;

FIG. 5 is a side exploded view of the battery holder assembly shown removed from the bicycle frame showing details of electric terminals of the battery holder assembly, seals dimensioned to fit around respective ones of the electric terminals and a battery in accordance with one embodiment of the present invention;

FIG. 6 is a side elevational view of the battery holder assembly shown removed from the bicycle frame with the battery installed such that seals are compressed between a portion of the battery holder assembly and the battery, sealing the electric terminals against outside contamination in accordance with one embodiment of the present invention;

FIG. 7 is a cross-sectional view taken along the line 7-7 in FIG. 6, showing aspects of the battery in accordance with one embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
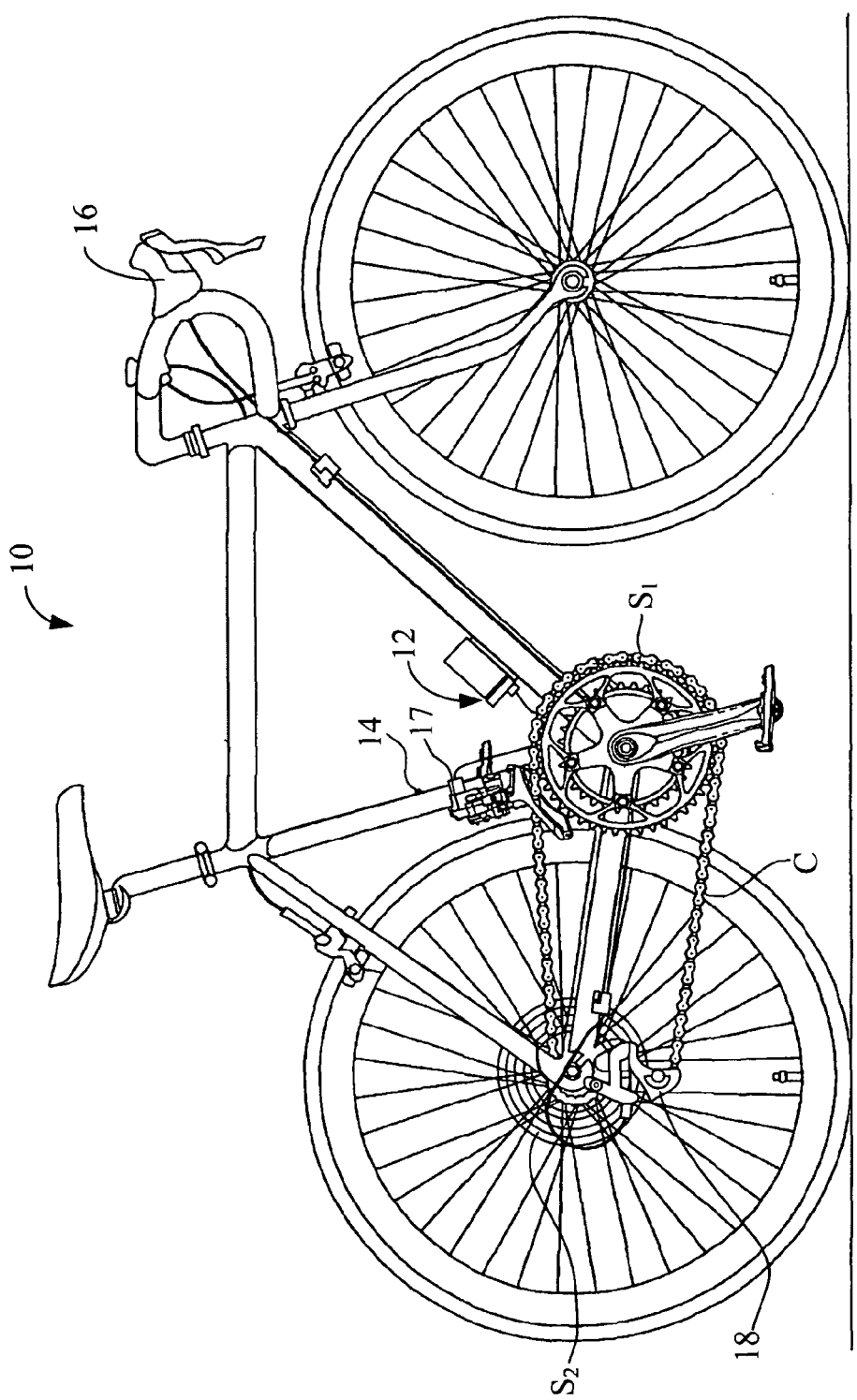
FIG. 1 is a side elevational view of a bicycle having bicycle frame a battery holder assembly attached to a portion of the bicycle frame in accordance with one embodiment of the present invention.

Referring initially to FIG. 1, a bicycle 10 that includes a battery holder assembly 12 mounted to a frame 14 of the bicycle 10 is illustrated in accordance with a first embodiment of the present invention.

As shown in FIG. 1, the bicycle 10 basically includes the frame 14, one or more powered components such as, for example, a shifter 16, a front derailleur 17 and a rear derailleur 18, and the battery holder assembly 12. The shifter 16 can be configured to electronically control positioning of a chain C relative to chain sprocket sets $S_1$ and $S_2$. Specifically, control signals from the shifter 16 are transmitted to an electric motor in each of the front derailleur 17 and the rear derailleur 18 to move the chain C in a conventional manner to the selected chain sprocket of one or the other of the chain sprocket sets $S_1$ and $S_2$. Since the motors in the front derailleur 17 and the rear derailleur 18 are electric powered, a power source is necessary.

As shown in FIGS. 2-4, the battery holder assembly 12 basically includes a terminal support portion 20, a pair of seal members 22 and a battery 24. The battery 24 also provides power to the shifter 16, the front derailleur 17 and the rear derailleur 18. The battery 24 is a replaceable battery pack. Alternatively, the battery 24 can be a rechargeable battery that is rechargeable by the electricity generating device mounted to the bicycle 10

As shown in FIGS. 2-6, the terminal support portion 20 includes a frame mounting portion 30, a battery securing section 32 and a pair of electric terminals 34.

Figure 8:
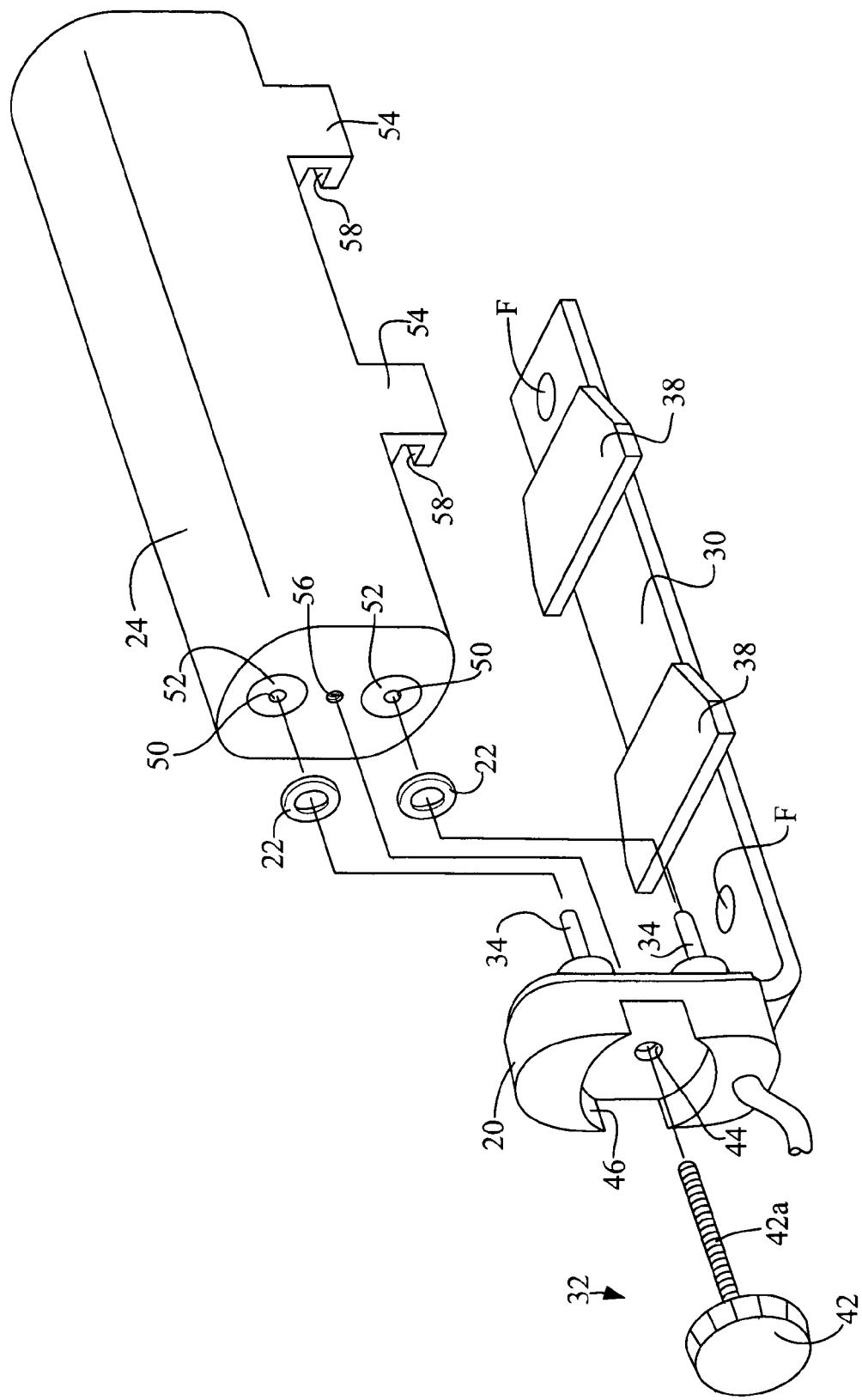
FIG. 8 is an exploded perspective view of the battery holder assembly showing features a terminal support portion, the electric terminals, the seals and the battery in accordance with one embodiment of the present invention.

With specific reference to FIGS. 2-7, the frame mounting portion 30 is an elongated rod-shaped portion that is configured to attach to the frame 14. Specifically, a pair of fasteners F extend through corresponding apertures in the frame mounting portion 30 to secure the frame mounting portion 30 to the frame 14. The frame mounting portion 30 also includes a pair of battery positioning portions 38. The battery positioning portions 38 are projections that extend outwardly from the frame mounting portion 30, as indicated in FIGS. 7 and 8 (only one battery positioning portion 38 can be seen in FIG. 7). The battery positioning portions 38 are configured and arranged to align the battery 24 relative to the terminal support portion 20 and the electrical terminal 34, as described in greater detail below.

The battery securing section 32 is configured and arranged to secure the battery 24 to the terminal support portion 20. The battery securing portion 32 includes a fastener 42. Further, the terminal support portion 20 is formed with an aperture 44 located between the electric terminals 34 and a recess 46 dimensioned to receive the fastener 42. The fastener 42 includes a threaded portion 42a (a fastening portion) that extends through the aperture 44 in the terminal support portion 20. The fastener 42 extends in a direction that is generally parallel to the electric terminals 34, as described in greater detail below. The fastener 42 is configured and arranged to urge the battery 24 and the terminal support portion 20 toward one another thereby compressing the seal members 22 about respective ones of the electrical terminals 34, as is also described in greater detail below.

Figure 9:
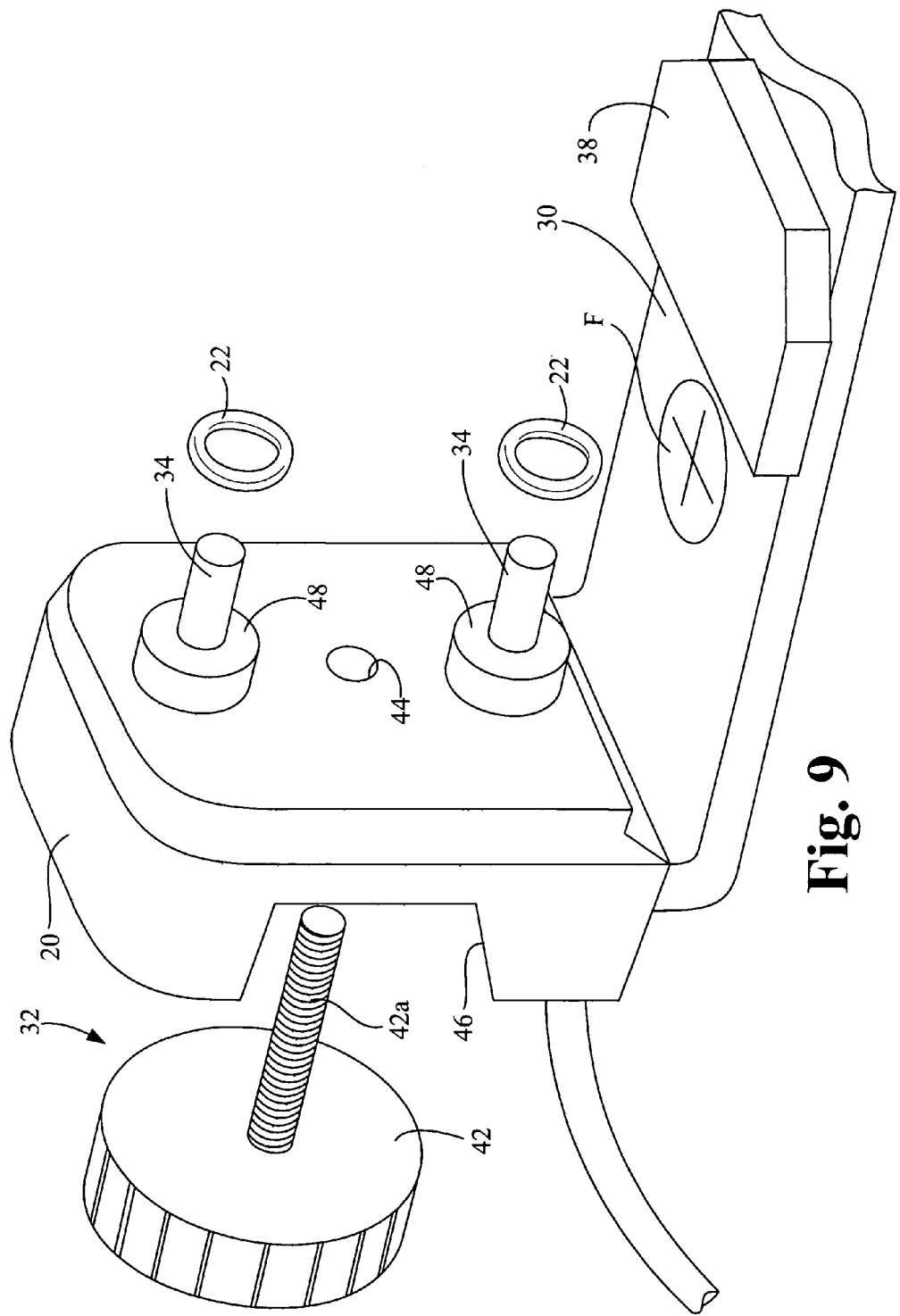
FIG. 9 is another exploded perspective view of the battery holder assembly from a different angle showing features a terminal support portion, the electric terminals, the seals and the battery in accordance with one embodiment of the present invention.

As shown in FIGS. 5, 8 and 9, the electric terminals 34 extend from the terminal support portion 20 in a direction generally parallel to one another and generally parallel to the frame mounting portion 30. The electric terminals 34 are configured to extend into corresponding terminal receiving portions of the battery 24, as described in greater detail below. As shown best in FIG. 9, annular surfaces 48 are formed on the terminal support portion 20 at base ends of the electric terminals 34. The annular surfaces 48 basically extend around respective ones of the electric terminals 34. The annular surfaces 48 extend in a direction perpendicular to the length of the electric terminals 34.

As shown in FIGS. 5, 6 and 8, each of the seal members 22 has an annular ring-like shape. Each of the seal members 22 is disposed around respective ones of the electrical terminals 34 adjacent to the terminal support portion 20. However, it should be understood from the drawings and the description herein that the seal members 22 can have any of a variety of shapes. For example, in the drawings, the seal members 22 resemble doughnuts. However, the seal members 22 can be formed with a flat hollow cylindrical shape. Alternatively, the seal members 22 can be formed as a single sheet of material with two apertures formed therein, the apertures spaced apart from one another to receive the electric terminals 34.

The seal members 22 are preferably made of resilient material(s) such as rubber, a flexible plastic or other easily flexed and/or compressible materials that exhibit waterproof type sealing characteristics.

As shown in FIGS. 7 and 8, the battery 24 includes a pair of apertures 50, annular surfaces 52, four legs 54 and a threaded aperture 56. The pair of apertures 50 serve as terminal receiving portions that are configured to receive the electrical terminals 22. Specifically, each of the two depicted apertures 50 is at least partially lined with a conductive material configured to conduct electric current between the battery 24 and a corresponding one of electric terminal 34 in a conventional manner. Since batteries are conventional electronic components, further description of the battery 24 is omitted for the sake of brevity.

As indicated in FIG. 6, each of the seal members 22 provides a seal between a respective one of the apertures 50 (the terminal receiving portions) and a respective one of the electrical terminals 34. The annular surfaces 52 of the battery 24 are smooth and are configured to contact the seal members 22 in order to ensure a reliable seal therebetween.

The battery 24 is also configured and arranged to engage the battery positioning portions 38 to orient the battery 24 relative to the terminal support portion 20. Specifically, the battery 24 includes the four legs 54. Each leg 54 includes a recess 58 dimensioned to receive a portion of the battery positioning portions 38.

Referring initially to FIGS. 2, 3 and 4, a description of a battery installation process is now provided. First as shown in FIG. 2, the seal members 22 are installed one respective ones of the electric terminals 34. Next, as also shown in FIG. 2, the battery 24 is moved in the direction corresponding approximately to the arrow $A_1$. Once the legs 54 of the battery 24 contact the frame 14 and/or the frame mounting portion 30, the battery 24 is then moved in the direction corresponding approximately to the arrow $A_2$, as shown in FIG. 3. As the battery 24 is moved in the direction corresponding approximately to the arrow $A_2$ from the orientation depicted in FIG. 3 toward the orientation depicted in FIG. 4, several things happen. First, the battery positioning portions 38 engage the recesses 58 in the legs 54 of the battery 24. At the same time, the electric terminals 34 insert into the apertures 50 of the battery 24. Also, the threaded portion 42a of the fastener 42 contacts the threaded aperture 56 in the battery 24. Finally, the fastener 42 is rotated such that the threaded portion 42a engages the threads in the threaded aperture 56, which draws the battery 24 toward the terminal support portion 20. As the threaded portion 42a of the fastener 42 is tightened in the threaded aperture 56 in the battery 24, the seal members 22 contact respective ones of the annular surface 52 of the battery 24 and the annular surfaces 48 that encircle the base portions of the electric terminals 34. Further tightening of the threaded portion 42a of the fastener 42 compresses the seal members 22 between the annular surface 52 of the battery 24 and the annular surfaces 48 at the base portions of the electric terminals 34.

Once the fastener 42 is fully tightened, the seal members 22 are compressed between the respective annular surfaces 48 and 52. The seal members 22 prevent moisture and debris from contacting or collecting on the electric terminals 34 and the apertures 50. In this manner, the electric terminals 34 and the apertures 50 (terminal receiving portions) of the battery 24 are protected.

The seal members 22 are easily replaced by reversing the above described process and removing the battery 24. Once the battery 24 is removed from the battery holder assembly 12, the seal members 22 are easily replaced and the battery 24 re-installed with a reliable seal between the terminal support port6ion 20 and the battery 24.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle battery holder assembly, comprising:
   a terminal support portion having a pair of electric terminals extending therefrom, the pair of electric terminals extending in a direction parallel to one another and configured to extend into corresponding terminal receiving portions of a battery;
   a battery securing section configured and arranged to releasably secure the battery to the terminal support portion, the battery securing section including a fastening portion that extends through the terminal support portion with a part of the fastening portion extending out from the terminal support portion in a direction generally parallel to the electric terminals, spaced apart from the electric terminals and between the electric terminals; and
   a pair of seal members extending around respective ones of the electric terminals such that the part of the fastening portion is not in contact with the electric terminals.

2. The bicycle battery holder assembly as set forth in claim 1, wherein
   each of the seal members has an annular ring-like shape.

3. The bicycle battery holder assembly as set forth in claim 1, further comprising:
   at least one battery positioning portion configured and arranged to align the battery relative to the terminal support portion and the electric terminal.

4. The bicycle battery holder assembly as set forth in claim 1, further comprising:
   a bicycle frame mounting portion configured to attach to a bicycle frame.

5. The bicycle battery holder assembly as set forth in claim 1, wherein
   the battery securing section is configured and arranged to urge the battery and the terminal support portion toward one another thereby compressing the seal members about respective ones of the electric terminals.

6. The bicycle battery holder assembly as set forth in claim 1, wherein
   each of the seal members has an annular ring-like shape and are disposed around respective ones of the electric terminals adjacent to the terminal support portion.

7. A bicycle battery holder assembly, comprising:
   a terminal support portion having a pair of electric terminals extending therefrom and in directions parallel to one another, and a battery securing section configured and arranged to secure the battery to the terminal support portion, the battery securing section including a fastener having a fastening portion that extends through the terminal support portion with a part of the fastening portion extending out from the terminal support portion in a direction generally parallel to the electric terminals, spaced apart from the electric terminals and between the electric terminals;
   a pair of seal members extending around respective ones of the electric terminals such that the part of the fastening portion of the fastener is not in contact with the electric terminals; and
   a battery having a pair of terminal receiving portions configured to receive the pair of electric terminals such that each of the seal members seals between a respective one of the terminal receiving portions and a respective one of the electric terminals, the battery also including a fastener receiving portion located between the terminal receiving portions.

8. The bicycle battery holder assembly as set forth in claim 7, wherein
   each of the seal members has an annular ring-like shape.

9. The bicycle battery holder assembly as set forth in claim 7, further comprising:
   at least one battery positioning portion configured and arranged to orient the battery relative to the terminal support portion.

10. The bicycle battery holder assembly as set forth in claim 9, wherein
   the battery includes at least one positioning portion configured and arranged to engage the battery positioning portion to orient the battery relative to the terminal support portion.

11. The bicycle battery holder assembly as set forth in claim 7, further comprising:
   a bicycle frame mounting portion configured to attach to a bicycle frame.

12. The bicycle battery holder assembly as set forth in claim 7, wherein
   the battery securing section is configured and arranged to urge the battery and the terminal support portion toward one another thereby compressing the seal members about respective ones of the electric terminals.

* * * * *